US006749673B2

(12) United States Patent
Moodycliffe et al.

(10) Patent No.: US 6,749,673 B2
(45) Date of Patent: Jun. 15, 2004

(54) BILIQUID FOAM FURNITURE POLISH

(75) Inventors: Timothy I. Moodycliffe, Milwaukee, WI (US); Ralph W. Oakeson, Racine, WI (US); Lynn M. Werkowski, Oak Creek, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 25 days.

(21) Appl. No.: 10/291,162

(22) Filed: Nov. 8, 2002

(65) Prior Publication Data

US 2004/0089195 A1 May 13, 2004

(51) Int. Cl.$^7$ .................................................. C09G 1/18
(52) U.S. Cl. .............................. 106/3; 106/11; 516/55; 516/72; 516/73; 516/74; 516/75; 516/76
(58) Field of Search ................................. 103/3; 106/11; 516/55, 72, 73, 74, 75, 76

(56) References Cited

U.S. PATENT DOCUMENTS

| | | |
|---|---|---|
| 3,669,892 A | 6/1972 | Abler et al. |
| 3,965,518 A | 6/1976 | Muoio |
| 4,040,857 A | 8/1977 | Lissant |
| 4,347,333 A | 8/1982 | Lohr et al. |
| 4,354,871 A | 10/1982 | Sutton |
| 4,486,333 A | 12/1984 | Sebba |
| 4,880,557 A | 11/1989 | Ohara et al. |
| 5,085,695 A | 2/1992 | Randen et al. |
| 5,171,475 A | 12/1992 | Freisleben |
| 5,397,384 A | 3/1995 | Wisniewski |
| 5,681,377 A | 10/1997 | Lohr et al. |
| 5,705,470 A | 1/1998 | Faris |
| 5,753,607 A | 5/1998 | Burke et al. |
| 5,849,838 A | 12/1998 | Barlow |
| 5,925,607 A | 7/1999 | Flanagan |
| 5,932,328 A | 8/1999 | Burke et al. |
| 5,954,864 A | 9/1999 | Roe |
| 5,977,050 A | 11/1999 | Faris |
| 6,022,727 A | 2/2000 | Worden et al. |
| 6,121,165 A | 9/2000 | Mackey et al. |
| 6,136,775 A | 10/2000 | Strout et al. |
| 6,165,479 A | 12/2000 | Wheeler |
| 6,312,760 B1 | 11/2001 | Wheeler |

OTHER PUBLICATIONS

F. Sebba, Biliquid Foams–A Preliminary Report, 40 J. Colloid. Interface Sci 468–474 (1972).
O. Sonneville–Aubrun et al., Surfactant Films In Biliquid Foams, 16 Langmuir 1566–1579 (2000).
A Disperse Technologies Limited 1998 technical presentation entitled "Advanced Topical Dispersion Technology".

*Primary Examiner*—C. Melissa Koslow

(57) ABSTRACT

Furniture polishes, and methods for their use, are disclosed. The polishes are liquids in the form of a dispersion which is a biliquid foam with a thickener, where the foam is structured as an oil-in-water complex. The dispersion has an oil portion having a polysiloxane and/or a hydrocarbon oil such as a mineral oil. There is also surfactant such as one nonionic surfactant and one more polar surfactant. Water is also provided. The polish is preferably essentially free alcohols.

10 Claims, No Drawings

BILIQUID FOAM FURNITURE POLISH

CROSS REFERENCE TO RELATED APPLICATIONS

Not applicable.

STATEMENT REGARDING FEDERALLY SPONSORED RESEARCH AND DEVELOPMENT

Not applicable

BACKGROUND OF THE INVENTION

This invention relates to furniture polishes. In particular, it relates to biliquid foam dispersions useful as furniture polishes, and methods of polishing furniture using them.

In U.S. Pat. No. 3,965,518 it was proposed to apply (via a wipe) a furniture polish containing, among other things, water, mineral oil, silicon oil, nonionic surfactant and/or anionic surfactant, preservative and pH adjustor, in an emulsion form. However, emulsions tend to require relatively high levels of surfactant to render them stable.

As the level of surfactant decreases, the stability of the emulsion often correspondingly decreases, leading to a need to shake the product before use. Should a consumer forget to shake the product, the resulting spray will have more of certain ingredients than desired while the residue in the container will similarly have skewed chemistry. This can lead to consumer dissatisfaction with the product as the person using the product the second time may not be the one who forgot to shake prior to the first usage. Also, the surfactants used in high concentration may not have optimal characteristics with respect to residues left on the furniture.

Moreover, some emulsions tend to interfere with the effectiveness of some antimicrobial agents. Antimicrobial agents are important both with respect to the storage of the polish and with respect to the surfaces being treated. In this regard, there is a recent trend towards including antimicrobials in products such that the surfaces being treated also have antimicrobial properties.

Also, silicone oils are particularly desirable ingredients in furniture polishes. They provide a highly desirable visual appearance. However, conventional emulsions tend to have stability and/or solubility problems when they contain silicone oils, absent the use of a polar hydrocarbon solvent. Many polar hydrocarbon solvents (especially alcohols) can be undesirable due to environmental or flammability concerns, or their effect on some furniture surfaces.

As also noted in U.S. Pat. No. 3,965,518, furniture polishes have been previously formulated in a variety of forms, such as pastes, lotions, creams, and emulsions sprayed from a pressurized container. When a furniture polish is delivered via an aerosol, an aerosol can is typically charged with emulsified polish liquid and also a propellant which is typically a hydrocarbon gas such as butane, propane, isobutane, isopropane, or mixtures thereof. The polish is sprayed from the can onto the surface to be treated, sometimes after shaking the can to re-establish the uniformity of the emulsion. See generally U.S. Pat. No. 4,354,871 for its discussion of aerosol emulsion furniture polishes.

In unrelated work the art has developed oil-in-water dispersions known as biliquid foams. In these dispersions the oil is present in discrete droplets surrounded by a first surfactant. The remaining water has dissolved in it a second surfactant. The second surfactant migrates to the surfactant-coated surface of the oil to create at least some drops (preferably most oil drops) surrounded by a bilayer of surfactant. See generally U.S. Pat. Nos. 4,486,333 and 6,312,760. See also F. Sebba, Biliquid Foams-A Preliminary Report, 40 J. Colloid. Interface Sci. 468–474 (1972); O. Sonneville-Aubrun et al., Surfactant Films In Biliquid Foams, 16 Langmuir 1566–1579 (2000) and a Disperse Technologies Limited 1998 technical presentation entitled "Advanced Topical Dispersion Technology".

Early versions of these foams suffered from significant instability. However, U.S. Pat. No. 6,165,479 taught that adding a viscosity modifier/thickener to such foams can markedly increase the stability of the foam. However, this patent was largely focused on formulating cosmetics, and thus did not address design/formulation problems in creating furniture polishes.

Thus, a need still exists for improved furniture polishes, particularly those containing polysiloxanes.

SUMMARY OF THE INVENTION

In one form the invention provides a furniture polish in the form of a dispersion comprising a biliquid foam having a thickener selected from the group consisting of carbomers, colloidal polymers and gums. The dispersion, apart from the thickener, has at least 0.01% by weight of an oil selected from the group consisting of polysiloxanes and hydrocarbon oils, between 0.0001% and 2% by weight of surfactant, and at least 10% by weight of water. The dispersion, apart from the thickener, will typically have between 0.0001% and 2% by weight of an essentially non-polar surfactant (e.g. a nonionic surfactant), and between 0.0001% and 2% by weight of a more polar surfactant selected from the group consisting of anionic surfactants, cationic surfactants and amphoteric surfactants.

In a particularly preferred form, the dispersion, apart from the thickener, has at least 1% by weight mineral oil, and at least 1% by weight of polysiloxane. High levels of mineral oil and polysiloxane (especially together totaling over ten percent of the dispersion apart from the thickener) that had previously made formulating emulsions that contain them particularly difficult.

The formulations of the present invention do not need to have polar volatile cosolvents to achieve stability, even when polysiloxanes are present. This may have certain advantages in jurisdictions that are particularly environmentally conscious. It may also have advantages where the treating material is applied to certain sensitive surfaces.

For example, the mixture can be essentially free of organic solvents having a volatility of greater than 0.1 mm/Hg at 20° C. Alternatively, the mixture can be essentially free of organic solvents having a volatility of greater than 0.13 mm/Hg at 20° C. Further, the mixture can be.essentially alcohol free.

In another aspect the invention provides a method of polishing a. piece of furniture (e.g. a table, a dresser, a chair, a bookcase, etc.). One obtains an aerosol container containing a liquid polish of the present invention. The polish is in the form of a dispersion, the dispersion having an oil-based biliquid foam and a thickener selected from the group consisting of carbomers, colloidal polymers and gums. The dispersion, apart from the thickener, has at least 1% by weight of silicone oil, at least 1% by weight of mineral oil, between 0.0001% and 2% by weight of nonionic surfactant, between 0.0001% and 2% by weight of a surfactant selected from the group consisting of anionic surfactants, cationic surfactants and amphoteric surfactants, and at least 10% by weight of water.

One sprays the polish against the piece of furniture. Polishes of this type are best used if one rubs the polish in with a cloth or the like. The cloth may contain mixtures of cellulosic fibers with other natural or synthetic fibers (e.g. cotton or wool), or be entirely formed of natural or synthetic fibers (e.g. rayon, polyamide fibers, acrylonitrile fibers, polyester fibers, vinyl fibers, protein fibers, fluorocarbon fibers, dinitrile fibers, etc.). A clothing rag is a typically suitable cloth.

The dispersion should include a thickener/viscosity modifier such as carbomers (such as a polymer of acrylic acid that has been cross-linked with a polyfunctional agent), colloidal polymers, or gums at a concentration of between 0.05 and 2%, preferably between 0.05 and 0.5%. Other examples are alginate gums or their salts, guar gum, locust bean gum, xanthane gum, gum acacia, gelatin, hydroxymethylcellulose, hydroxyethyl-cellulose, hydroxypropylcellulose, carboxymethylcellulose, salts of these compounds, bentonites, magnesium aluminum silicates, and glyceryl polymethacrylates and their dispersions in glycols, and mixtures thereof. The most preferred thickener for our furniture polishing wipes is a salt of a cross-linked polymer of acrylic acid known as Carbopol® Ultrez 5 (which is available from B.F. Goodrich). This thickener is a polymer of acrylic acid cross-linked with allylpentaerythritol.

The dispersion may also have other optional ingredients. For example, there may be a preservative such as Kathon® ICG which is available from Rohm and Haas, appropriately pH adjusted with sodium hydroxide.

There may also be scratch cover colorants, fragrances and other additives as are conventional in the furniture polishing field when the product is a furniture polish. See generally U.S. Pat. No. 5,849,838.

A wide variety of nonionic surfactants appear to be used for the purposes of the present invention. We particularly prefer the use of Laureth-4 (polyethylene glycol ether of lauryl alcohol). However, one could instead use an alkanolamide, an ester of a polyhydric alcohol (for example an ester of an ethylene, diethylene or propylene glycol, or glycerol or a polyglycerol, or sorbitan, glucose or sucrose), a polyoxyethylene or polyoxypropylene derivative of an alcohol, amide or ester, or a polyoxyethylene/polyoxypropylene block copolymer, or a suitable compatible mixture thereof.

The other surfactant (when, as is typical, two are used) can be selected from a wide variety of more polar surfactants. We prefer the anionic surfactant sodium lauryl ether sulphate. However, numerous other anionics should be suitable. Examples are acyl-lactate, N-acylsarcosinate, alkyl-carboxylate (either mono- or polyvalent), alkyl ether carboxylate, N-alkyl-glutamate, fatty acid-peptide condensate, phosphated ethoxylated alcohol, alkyl sulphate, ethoxylated alkyl sulphate, alpha-olefin sulphonate and ester-linked sulphonate.

The other surfactant may also be a cationic surfactant, an example of which is an amidoamine. Alternatively, the other surfactant might be an amphoteric such as acylaminoacid, an N-substituted alkylamine, an N-alkyl-β-aminopropionate, an N-alkylbetaine, an alkylimidazoline and a sulphobetaine.

The preferred polysiloxanes are dimethylpolysiloxanes. However, other silicones can also be used. Further, a wide variety of hydrocarbon oils should be suitable. Preferred viscosity ranges are between 50 cts and 5,000 cts.

The present invention provides furniture polishes that are highly stable, are suitable to have incorporated therein propellants and polysiloxanes, and do not require high levels of volatile or organic components.

While preferred embodiments have been discussed above and will be discussed below, it should be appreciated that these are merely examples of the invention. For a more complete appreciation of the full scope of the invention the claims should be reviewed.

DETAILED DESCRIPTION OF THE PREFERRED EMBODIMENTS

One preferred furniture polish dispersion for use in the present invention has the following formula:

| Weight Percent | Common name (may be a commercial name) | Chemical Name |
|---|---|---|
| to 100% | | water |
| 10% | B-52 propellant | butane/propane mix |
| .2% | Carbopol ® Ultrez 5 | carbomer |
| 9.82% | Klearol | white mineral oil |
| 4% | PDMS 100 cts | polydimethylsiloxane |
| 4% | PDMS 1000 cts | polydimethylsiloxane |
| .18% | nonionic surfactant | Laureth-4 |
| .02% | anionic surfactant | sodium lauryl ether sulphate |
| .05% | Kathon ® CG/ICP | methychloroisothiazolone |
| .53% | | sodium hydroxide |

Klearol mineral oil is available from Witco Corp. and consists of saturated aliphatic and alicyclic non-polar hydrocarbons. The polysiloxanes can be obtained from a variety of different sources, such as Wacker Silicones or Dow Corning. Laureth-4 is a widely available nonionic surfactant (also known as polyethylene glycol ether of lauryl alcohol).

In producing the dispersion, one preferably first mixes the three oil components with the nonionic surfactant (Laureth-4). One then separately mixes the water, thickener, anionic surfactant (sodium lauryl ether sulphate), Kathon® preservative and sodium hydroxide. At this point, one takes about 10 percent of the water phase and places it in a container. One then slowly drops the oil phase into the water phase while gently stirring at the top surface of the oil phase.

Once the oil phase has been entirely added to the container, one then adds the remaining portion of the water phase. This latter step can be done more quickly than the step of addition of the oil to the 10 percent of the water.

The reason for this particular preferred method of formation of the biliquid foam is to provide the oil with the ability to be completely surrounded by the water phase in a properly ordered manner. This helps greatly in the formation of the biliquid foam.

Where the dispersion is to be part of an aerosol product, one then places the liquid dispersion in a pressurizable container and then adds a propellant gas to the container using a conventional gas filling technique. The container can have a conventional exit valve structure so that the mixture can be expelled from the aerosol container by pressing a button or the like.

An alternative polish which is not aerosolized could have the following formula:

| Weight Percent | Common name (may be a commercial name) | Chemical Name |
|---|---|---|
| to 100% | | water |
| .222% | Carbopol ® | carbomer |
| 10.91% | Klearol | mineral oil |
| 4.44% | PDMS 100 cts | polydimethylsiloxane |
| 4.44% | PDMS 1000 cts | polydimethlysiloxane |
| .2% | nonionic surfactant | Laureth-4 |
| .023% | anionic surfactant | sodium lauryl ether sulphate |
| .055% | Kathon ® CG/ICP | methychloroisothiazolone |
| .588% | | sodium hydroxide |

It should be noted that the polishes do not need to have polar volatile hydrocarbon solvents such as alcohols, even though polysiloxanes are included. This may be advantageous with respect to certain particularly sensitive furniture items, and in any event is desirable for certain environmental reasons.

While the preferred preservative is Kathon® CG/ICP, the formulation may also contain other antimicrobial agents such as an ester of p-hydroxybenzoic acid, formalin or imidazolidinylurea.

The polishes of the present invention may be used in a manner similar to the way that aerosol furniture polishes such as Pledge® brand polishes are currently used. In this regard, one takes the polish and applies a desired amount (e.g. several ml of the polish) on a relatively small surface of furniture (e.g. a square meter) to be polished. In the case of an aerosol spray, the container will be held about six inches away from the surface to apply the polish in a spray. In the case of non-aerosol polishes, an appropriate amount of polish is poured or squeezed onto the surface.

In either case, it is typical for the polish to be spread and worked in by rubbing a cloth or other wipe over the surface. The surface may also be buffed if desired.

Due to the stability of the dispersion, the container for the polish need not be shaken or mixed prior to use. Further, while the biliquid foam itself will not provide improved cleaning, the biliquid foam formulations tested to date have provided improved performance, through improved wipeability, which results in less effort and less smearing, as well as desirable gloss. In this regard, a polish will often be used for combined purposes (e.g. dusting and polishing). The polishes of the present invention are very effective at transferring dust from the furniture to the rubbing cloth.

While the preferred embodiments have been described above, there are numerous other embodiments that are within the spirit and scope of the invention. Thus, the claims should be looked to in order to appreciate the full scope of the invention, and the claims are not to be construed to be limited to just the preferred embodiments.

INDUSTRIAL APPLICABILITY the invention provides improved furniture polishes, and methods for their use.

We claim:

1. A furniture polish, comprising:
   a liquid in the form of a dispersion, the dispersion comprising a biliquid foam having a thickener selected from the group consisting of carbomers, colloidal polymers and gums, the dispersion, apart from the thickener, comprising:
   at least 0.01% by weight of an oil selected from the group consisting of polysiloxanes and hydrocarbon oils;
   between 0.0001% and 2% by weight of surfactant; and
   at least 10% by weight of water.

2. The polish of claim 1, wherein the polish is essentially free of organic alcohol.

3. The polish of claim 1, wherein the dispersion, apart from the thickener, comprises between 0.0001% and 2% by weight of nonionic surfactant, and between 0.0001% and 2% by weight of a surfact-ant selected from the group consisting of anionic surfactants, cationic surfactants and amphoteric surfactants.

4. The polish of claim 1, further comprising a pressurized gas.

5. The polish of claim 1, wherein the thickener is a salt of a cross-linked polymer of acrylic acid.

6. The polish of claim 1, wherein the dispersion, apart from the thickener, comprises at least 1% by weight mineral oil and at least 1% by weight of polysiloxane.

7. The polish of claim 5, wherein the dispersion, apart from the thickener, comprises two different polysiloxanes having different viscosities from each other.

8. The polish of claim 1, further comprising an antimicrobial agent.

9. The polish of claim 1, wherein the dispersion, apart from the thickener, comprises no more than 1% by weight of surfactant in total.

10. A method of polishing a piece of furniture, comprising:
    obtaining an aerosol container containing a liquid polish in the form of a dispersion, the dispersion comprising a biliquid foam having a thickener selected from the group consisting of carbomers, colloidal polymers and gums, the dispersion, apart from the thickener, comprising:
    at least 1% by weight of silicone oil;
    at least 1% by weight of mineral oil;
    between 0.0001% and 2% by weight of nonionic surfactant;
    between 0.0001% and 2% by weight of a surfactant. selected from the group consisting of anionic surfactants, cationic surfactants and amphoteric surfactants;
    a propellant; and
    at least 10% by weight of water;
    wherein the dispersion is essentially free of organic alcohol; and
spraying the polish against the furniture.

* * * * *